3,509,070
ADSORBENT FOR CHROMATOGRAPHIC PURIFICATION OF VIRUS

Milton Lapidus, Rosemont, Pa., assignor to American Home Products Corporation, New York, N.Y., a corporation of Delaware
No Drawing. Continuation-in-part of application Ser. No. 497,540, Oct. 18, 1965, which is a continuation-in-part of application Ser. No. 396,726, Sept. 15, 1964. This application June 13, 1968, Ser. No. 736,561
Int. Cl. B01j *11/82;* C01b *25/32;* A61k *23/00*
U.S. Cl. 252—437                7 Claims

ABSTRACT OF THE DISCLOSURE

This invention relates to an alkali treated calcium dihydrogen orthophosphate monohydrate adsorbent. Further, it concerns an alkali and trimetaphosphate treated calcium dihydrogen orthophosphate monohydrate adsorbent. Still further, it relates to the processes for the preparation of these adsorbents and to their use in virus purification.

---

This application is a continuation-in-part of co-pending U.S. application, Ser. No. 497,540, filed Oct. 18, 1965 and now abandoned which is a continuation-in-part of its parent U.S. patent application, Ser. No. 396,726, filed on Sept. 15, 1964, which is now abandoned.

This invention relates to the purification and concentration of virus. More particularly, this invention relates to new and improved adsorbent compositions particularly effective in purifying influenza virus. The present invention also encompasses the novel method by which these new adsorbent compositions are prepared as well as the method by which the same can be utilized in preparing highly purified forms of influenza virus.

In the U.S. Patent No. 3,368,867, entitled, "Chromatographic Purification of Influenza Virus With Brushite Modified by Autoclaving," filed on Sept. 15, 1964 and issued on Feb. 13, 1968, there is described a new adsorbent of the calcium phosphate family, namely, autoclaved brushite. As described therein, it was found quite unexpectedly that by autoclaving brushite, separation and concentration of influenza virus from allantoic fluids containing the same could be substantially improved. It is further shown in U.S. Patent No. 3,368,867 that the autoclaved brushite made possible a substantial improvement in the degree or level of purification of Sharples concentrated B strain influenza virus.

It has now been discovered according to the present invention that another calcium salt, namely, calcium dihydrogen orthophosphate monohydrate [$Ca(H_2PO_4)_2 \cdot H_2O$] if treated according to the method of the present invention is effective in separating various strains of virus including the B strain from influenza infected allantoic fluid. It has also been found that the effectiveness of this adsorbent composition is further improved if the adsorbent is treated with an alkali metal trimetaphosphate e.g. sodium trimetaphosphate or potassium trimetaphosphate prior to use. Utilization of an alkali metal trimetaphosphate for this purpose as distinguished from the conventional phosphate buffers such as dibasic sodium phosphate ($Na_2HPO_4$) affords an unexpected increase in recovery of A strains of influenza virus and an increased purification factor, generally in the order of four to five times.

In addition and more importantly, the new adsorbent of the present invention when treated with an alkali metal trimetaphosphate substantially improves both the yield and purification of B strains of influenza virus from the fluids in which such strains are normally present. This improvement is in the order of a four to five fold increase in recovery and up to a ten fold increase in the degree or level of the virus purification obtained. This and other advantages are provided by the novel adsorbent of the present invention and the method in which the same is used.

Considered in its broadest aspect, the new adsorbent of the present invention is the monohydrate of calcium dihydrogen orthophosphate which is treated with an aqueous solution of an alkali to provide a suspension having a pH in the range of about 5.5 to about 8.0, preferably about 6.5. As employed herein the term "alkali" is meant to comprise those aqueous solutions which contain compounds which yield hydroxyl ions upon dissolution. Many such "alkali" will readily suggest themselves to those skilled in the chemical art. Some examples thereof are: sodium or potassium nitrate, sodium or potassium acetate and sodium or potassium hydroxide. In a preferred embodiment of this invention, calcium dihydrogen orthophosphate monohydrate be mixed with a limited quantity of water such as from about one to not more than about five parts of water per part of salt and preferably from about three to about five parts of water per part of salt should be used. After addition of the monohydrate of calcium dihydrogen orthophosphate, stirring of the resulting suspension is continued during which the alkali is added slowly over a period of from about one-half to about two hours until the adjusted pH of about 5.5 to about 8.0 is achieved, preferably about 6.5. During this period the reaction mixture is kept at a temperature of not more than about 40° C. and preferably a temperature of from about 20° to 30° C., although temperatures as low as about 0° C. may be employed. Thereafter, the alkali treated adsorbent is permitted to settle and the supernatant liquid is decanted. The residue is then washed with water until the pH of the water wash is at least 0.2 unit higher than the adjusted pH of the above suspension and is in the range of from about 5.7 to about 8.2. The alkali treated calcium dihydrogen orthophosphate monohydrate adsorbent may then be kept in the supernatant fluid or the latter can be decanted to leave the solid adsorbent in a stable form which is ready for use. When the alali treated adsorbent is used for virus purification, the procedure employed is similar to that hereinafter described for the alkali and TMP treated adsorbent except that the adsorbent is not treated with an alkali metal trimetaphosphate. Further, the virus containing fluid may or may not be TMP treated.

As previously indicated, the preparation of the alkali treated calcium dihydrogen orthophosphate monohydrate adsorbent according to the method described above provides an unexpectedly effective means for recovering a highly purified virus from influenza infected source materials. However, it is an added feature of the present invention to increase and further activate this alkali treated adsorbent by treating the same with sufficient amount of an alkali metal trimetaphosphate (TMP) preferably sodium trimetaphosphate ($Na_3P_3O_9$) until the pH of the adsorbent reached a range from about 7.5 to about 8.5, preferably about 8.0. At this pH, the alkali and TMP treated adsorbent is particularly effective, as is demonstrated more clearly hereinafter, in separating influenza visus from allantoic fluid. This alkali and TMP adsorbent is particularly effective in recovering the B/GL strain of influenza virus fluids containing the same.

When the alkali and TMP treated calcium dihydrogen orthophosphate monohydrate adsorbent is used for virus purification, it is placed or packed in a conventional chromatographic column having the necessary adsorbent support. If the pH of the adsorbent has not previously been adjusted to the desired pH, e.g. a pH of about 8.0, the same is washed with an aqueous alkali metal trimetaphosphate solution, e.g. sodium trimetaphosphate preferably at a molar content of about 0.01. The virus-containing fluid such as allantoic fluid is usually diluted from about a 2:1 to about a 5:1 ratio with water and adjust to a pH range of about 7.0 to about 9.0 after the addition of the alkali metal trimetaphosphate. While effective purification of the virus can be obtained at these dilution and pH ranges, it has been found that higher flow rates are obtained in the column at a preferred dilution ratio of about 2:1 and a pH of about 8.

To concentrate the influenza virus, the alkali metal trimetaphosphate treated and pH-adjusted allantoic fluid containing the virus is then poured onto and through the prepared column. The amount of virus solution delivered to the column will depend on the size of the column and the quantity of adsorbent contained therein. It is preferred that the column be operated in a continuous manner and not permitted to run dry. When the total amount of infected allantoic fluid has been placed on the column, the virus is washed with an aqueous alkali metal trimetaphosphate solution (pH 8), e.g. sodium trimetaphosphate. Thereafter, the virus is recovered by elution. In carrying out this elution to provide a purified concentrate of the virus a conventional buffer with a pH in the range of about 5.0 to about 9.0 having a molar concentration of about 0.5 M to about 2.0 M is employed. Preferably a 1.0 M phosphate buffer e.g. dibasic sodium phosphate having a pH of about 6.5 to about 7.0 is used.

Reference now to the specific examples which follow will provide a better understanding of the nature and characteristics of the new adsorbent composition of the present invention, the method by which the same is prepared and the manner in which it is used.

EXAMPLE I

Fifty grams of calcium dihydrogen orthophosphate monohydrate [$Ca(H_2PO_4)_2 \cdot H_2O$] and 200 ml. of distilled water are stirred vigorously for fifteen minutes. With stirring a cold (4° C.) 3 N sodium hydroxide solution is added dropwise thereto at room temperature over a period of one-half hour until a pH of 6.5 is obtained. Thereafter, stirring is continued for one hour, the adsorbent is allowed to settle and the supernatant is removed by decantation. The adsorbent is washed with one liter portions of distilled water until the supernatant liquid has a pH of 7.2–7.4.

pH history of absorbent during the alkali treatment cycle

| Conditions: | pH |
|---|---|
| 50 g. $Ca(H_2PO_4)_2 \cdot H_2O$+200 ml. water | 2.3 |
| 109 ml. 3 N sodium hydroxide | 6.5 |
| One hour stirring | 6.5 |
| 1 liter water wash | 6.8 |
| 1 liter water wash | 7.05 |
| 1 liter water wash | 7.3 |

EXAMPLE II

One hundred grams of calcium dihydrogen orthophosphate monohydrate [$Ca(H_2PO_4)_2 \cdot H_2O$] and 500 ml. of distilled water are stirred for a half hour. Thereafter, with continuous stirring at room temperature 2 N potassium hydroxide is added dropwise over a period of two hours until a pH of 6.5 is obtained. The stirring is continued for another hour, then the supernatant liquid is decanted and the solid residue washed with two liter portions of distilled water until the pH of the supernatant liquid is 7.0. Thereafter, the supernatant liquid is decanted to afford the stable adsorbent.

In like manner, a 1:3 ratio of calcium dihydrogen orthophosphate monohydrate and water is treated with a potassium bicarbonate solution at 40° C. until a pH of 6.0 is obtained. Thereafter, the solid is separated from the suspension and washed with water until a pH of 7.5 is achieved.

EXAMPLE III

Repeating the procedure of Examples I and II a mixture containing 1:2 ratio of calcium dihydrogen orthophosphate monohydrate and water is treated with an aqueous sodium bicarbonate solution at 5° C. until the pH of the mixture is 5.5. Thereafter, the supernatant liquid is removed and the residue washed three times with two liter portions of water until the pH is in the range of 5.7 to 8.2.

The above procedure is repeated with similar results using the following alkali agents: sodium carbonate, potassium carbonate, sodium nitrate, potassium nitrate, sodium acetate and potassium acetate.

EXAMPLE IV

Fifty grams of calcium dihydrogen orthophosphate monohydrate and 200 ml. of distilled water are stirred vigorously for fifteen minutes. Under conditions of continuous mixing, a cold (4° C.) 3 N sodium hydroxide solution is added dropwise over a period of one-half hour until a pH of 6.5 is reached. The contents of the reaction mixture is kept at 20–23° C. After stirring for one hour, the adsorbent is permitted to settle and the supernatant liquid is decanted. The adsorbent is washed batchwise with one liter portions of distilled water until the pH of the supernatant liquid is 7.2–7.4. The adsorbent is then batch washed with a 0.01 M sodium trimetaphosphate (pH 8) solution until a pH of 8 is reached.

pH history of adsorbent during alkali and TMP treatment cycle

| Conditions: | pH |
|---|---|
| 50 g. $Ca(H_2PO_4)_2 \cdot H_2O$+200 ml. water | 2.3 |
| 109 ml. 3 N sodium hydroxide (4° C.) | 6.5 |
| One hour stirring | 6.5 |
| 1 liter water wash | 6.8 |
| 1 liter water wash | 7.05 |
| 1 liter water wash | 7.3 |
| 1 liter .01 M, pH 8, sodium trimetaphosphate wash | 7.65 |
| 1 liter .01 M, pH 8, sodium trimetaphosphate wash | 8.00 |

Similarly, with like results the above procedure is conducted with a 0.01 M potassium trimetaphosphate solution.

EXAMPLE V

The alkali treated adsorbents of Examples II and III are washed with an aqueous solution of an alkali metal trimetaphosphate as demonstrated in Example IV until the pH of the adsorbent is in the range of about 7.5 to about 8.5.

EXAMPLE VI

Fifty grams of $Ca(H_2PO_4)_2 \cdot H_2O$ treated according to Example IV is placed in a glass column containing a sintered glass disk to support the bed of 4.4 x 6 cm. size. To the column there is delivered five liters of diluted infected allantoic fluid containing B/GL virus. The fluid having an adjusted pH of 9.0 contained 0.01 M sodium trimetaphosphate flow through the column over a period of two hours. The column is then washed with 200 ml. of 0.01 M sodium trimetaphosphate (pH 8) solution and the virus eluted with 0.5 M phosphate buffer (pH 6.8)

solution. In the data reported below, column fraction 2 represents the recovered virus.

| Sample | Volume, ml. | CAA | Lowry protein, mg. | CCA/ mg. L.P. | P.F. | Percent recovery |
|---|---|---|---|---|---|---|
| Infected allantoic fluid | 5,000 | 19,000 | 925 | 20.5 | | |
| Column fraction 1 | 5,200 | | 954 | | | |
| Column fraction 2 | 100 | 12,800 | 15 | 853.3 | 41.6 | 67 |

NOTE.—CCA means Chick-Cell Agglutination Units and P.F. means Purification factor.

By the above procedure a recovery of 67 percent of the B strain is obtained at a purification factor of 41.6.

Similar results are afforded by the alkali and TMP treated adsorbents described in Example V when the virus-containing fluid is diluted from about a 2:1 to about a 5:1 ratio with water, adjusted to a pH range of about 7.0 to about 9.0 and eluted from the column with a 0.3 M to a 2.0 M phosphate buffer having a pH of about 5.0 to about 9.0.

EXAMPLE VII

In a similar manner to Example VI, the purification of influenza virus A/Jap. 305 is carried out on 300 g. of alkali and TMP treated calcium dihydrogen orthophosphate monohydrate adsorbent. The virus is first adjusted to a pH of 9.0. The following results were obtained:

| Sample | Volume, ml. | CCA | Lowry protein, mg. | CCA/mg. L.P. | P.F. | Percent recovery |
|---|---|---|---|---|---|---|
| Infected allantoic fluid | 20,000 | 542,000 | 5,550 | 97.7 | | |
| Column fraction 1 | 21,000 | 102,900 | 5,040 | 20.4 | | |
| Column fraction 2 | 240 | 601,584 | 146.4 | 4109 | 47.6 | 111 |

By the above procedure, a recovery of 111 percent of the virus is obtained at a purification factor of 47.6.

EXAMPLE VIII

In a manner similar to the Examples VI and VII, a series of runs are carried out on a variety of influenza virus strains, identified below according to the conditions and with the alkali and TMP treated adsorbent of the present invention. The columns used have varying capacities of from 46 to 102.1. The following table summarizes the results obtained with these various strains of influenza:

| Run No. | Strain | Total CCA recovered | Percent recovery | P.F. (1) | CCA/mg. L.P. |
|---|---|---|---|---|---|
| 1 | A/PR-8 | 3,949,920 | 79 | 43 | 4028 |
| 2 | A/Jap 305 | 5,904,990 | 101 | 31 | 3463 |
| 14 | A/Ann Arbor | 15,933,135 | 87 | 28 | 5239 |
| 9 | B/Great Lakes | 5,186,250 | 67 | 32 | 3179 |
| 13 | B/Maryland | 5,608,800 | 86 | 38 | 4,560 |
| 12 | A/Jap 170 | 6,711,390 | 102 | 25 | 1,901 |

1 Based on specific activity before and after purification S.A.=CCA/mg. Lowry Protein.

By the above procedure, recovery of the various strains of influenza viruses varied from 67 percent to 102 percent at purification factors from 25 to 43.

Similar results are obtained when the alkali and TMP treated adsorbents of Example V are employed.

EXAMPLE IX

When the alkali treated calcium dihydrogen orthophosphate monohydrate adsorbent of Example I is employed to purify a variety of influenza virus strains, the procedure of the prior example is employed, except that the adsorbent and virus infected allantoic fluids are not treated with an alkali metal trimetaphosphate. The results thereof are set forth below:

| Virus * | Jap 305 | PR-8 | Ann Arbor | B/GL |
|---|---|---|---|---|
| Put on Col. CCA | 122,000 | 130,000 | 144,000 | 72,000 |
| Recovered CCA | 57,000 | 82,000 | 38,200 | 10,200 |
| Percent factor | 46.7 | 63.0 | 26.4 | 14.1 |
| Purification factor | 12.3 | 20.1 | 7.2 | 4.8 |

*Infected allantoic fluid.

By the above procedure, recovery of various strains of influenza virus varied from 14 percent to 46.7 at purification factors of from 4.8 to 20.1. As will be noted, particularly with respect to the recovery of the B strain Great Lakes (B/GL) a recovery of fourteen percent is attained at a purification factor of 4.8 with this alkali treated adsorbent which contrasts with the results of Example VI in which the alkali and TMP treated adsorbent affords a recovery of 67 percent with a purification factor of 41.6. In a similar manner the results obtained when purifying A strain/Jap. 305 without an alkali metal trimetaphosphate treatment provides a 46.7 recovery and a purification factor of 12.3, whereas when the adsorbent is treated with an alkali metal trimetaphosphate the recovery is one hundred and one percent obtained at a purification factor of 31.

Similar results are obtained when alkali treated calcium dihydrogen orthophosphate monohydrate adsorbents of Examples II and III are employed to purify the influenza virus strains reported in the prior example.

EXAMPLE X

Two columns (columns A and B) are prepared: for each, 100 grams of $CA(H_2PO_4)_2 \cdot H_2O$ are prepared according to Example IV and placed in a glass column. To each column there is then delivered one liter of undiluted infected allantoic fluid containing A/Jap. 170. virus which are previously adjusted with 0.01 M sodium trimetaphosphate. For column A the fluid is pre-heated to 37° C. while for column B the fluid is cooled to 10° C. prior to application to the column. For both columns, recoveries by elution with 1 M pH 6.8 phosphate buffer are as follows:

| Sample | Volume | Total CCA | Recovery, percent |
|---|---|---|---|
| Infected fluid | 1,000 | 273,000 | |
| Column A: | | | |
| Fraction 1 | 1,210 | <4,840 | <1.7 |
| Fraction 2 | 23 | 93,311 | 34.2 |
| Column B: | | | |
| Fraction 1 | 1,250 | <5,000 | <2 |
| Fraction 2 | 27 | 113,292 | 44.5 |

It should be noted that in both columns above improvement in the concentration of CCA units per ml. is achieved from the starting level of 273 CCA per ml. in the allantoic fluid. The concentration is approximately 15-fold for both columns (4057 CCA per ml. in A and 4196 CCA per ml. in B).

EXAMPLE XI

In a manner comparable to the preceding example, 750 ml. of A2/Jap. 170 virus are applied to the column at a temperature of 4° C. after having been diluted with an equal volume of water and then adjusted to 0.01 M sodium trimetaphosphate. The recovery of virus so processed is as follows:

| Sample | Volume | Total CCA | Recovery, percent |
|---|---|---|---|
| Infected Fluid | 1,500 | 64,500 | |
| Fraction 1 | 1,680 | <6,720 | <1.7 |
| Fraction 2 | 29 | 40,136 | 62 |

EXAMPLE XII

In a manner similar to the preceding examples, a column is prepared in which cold 3 N sodium hydroxide is added dropwise to the adsorbent until a pH of 3.0 is reached. The recovery of A/Jap. 170 virus so processed is as follows:

| Sample | Volume, ml. | CCA/ml. | Total CCA | Percent Recovery |
|---|---|---|---|---|
| Infected Allantoic fluid | 750 | 224 | 168,000 | |
| Column Fraction 1 | 1,690 | <4 | <6,760 | <4.0 |
| Column Fraction 2 | 68 | 1,446 | 98,328 | 58.5 |

EXAMPLE XIII

Two columns are prepared: for each, 100 grams of $Ca(H_2PO_4)_2 \cdot H_2O$ are prepared according to Example IV. After adjusting to pH 8.0 with 0.01 molar sodium trimetaphosphate buffer wash, the adsorbents are maintained in the buffer wash overnight at room temperature. The adsorbents are then placed in glass columns and adjusted to pH 7.0 (column A) and pH 7.5 (column B) with 0.01 molar sodium trimetaphosphate buffer wash. A volume of 500 ml. of B/Maryland strain infected allantoic fluid is applied to each column, after having been diluted with an equal volume of distilled water and adjusted to pH 8.0 with a 0.01 molar sodium trimetaphosphate solution. The virus is recovered from the columns by elution with 1.0 molar phosphate buffer. The following results are obtained:

| Sample | Volume, ml. | CCA, ml. | Total CCA | Percent recovery |
|---|---|---|---|---|
| Infected Allantoic fluid | 500 | 217 | 108,500 | |
| Column A, Fraction 2 | 67 | 1,469 | 98,423 | 91 |
| Column B, Fraction 2 | 70 | 1,204 | 84,280 | 77 |

EXAMPLE XIV 100 g. of $Ca(H_2PO_4)_2 \cdot H_2O$ are prepared according to Example IV, and placed in a glass column. The adsorbent is then washed with 0.01 molar pH 10.0 sodium trimetaphosphate to a column pH of 9.0. To the column, there is then delivered 750 ml. of diluted B/Maryland strain infected allantoic fluid, adjusted to pH 8 with a 0.01 molar sodium trimetaphosphate solution. The virus is eluted with 1.0 molar (pH 8.0) phosphate buffer, and the following results are obtained:

| Sample | Volume ml. | CCA/ml. | Total CCA | Percent recovery |
|---|---|---|---|---|
| Infected Allantoic fluids | 750 | 289 | 216,750 | |
| Fraction 1 | 1,815 | 41 | 74,415 | 34 |
| Fraction 2 | 44 | 976 | 42,944 | 20 |

It should be noted that concentration and recovery with a TMP treated column having a pH of 9.0 is not as good as that obtained at a TMP column pH of 7.0 and 7.5 respectively, as shown in Example XIII. However, some improvement in the concentration of CCA units per ml. is achieved with a trimetaphosphate treated column having a pH of 9.0.

EXAMPLE XV

In a manner similar to Example IV, the purification of B/Maryland strain of influenza virus is carried out on four columns containing 100 grams of $Ca(H_2PO_4)_2 \cdot H_2O$ per column. The virus is eluted with 1.0 molar phosphate buffer, pH 6.8, 7.5, 8.0 and 9.0 respectively. The following results are obtained:

| Sample | Elution pH | Volume, ml. | CCA/ml. | Total CCA | Percent recovery |
|---|---|---|---|---|---|
| Infected Allantoic Fluid | | 500 | 427 | 213,500 | |
| Column A | 6.8 | 38 | 4,595 | 174,610 | 82 |
| Column B | 7.5 | 42 | 5,153 | 216,426 | 101 |
| Column C | 8.0 | 42 | 5,302 | 222,624 | 104 |
| Column D | 9.0 | 53 | 4,782 | 253,446 | 119 |

EXAMPLE XVI

In a manner similar to Example XV, the purification of $A_1$/AA strain of influenza virus is carried out on four columns. The virus is eluted with 1.0 molar phosphate buffer, pH 6.8, 7.5, 8.0 and 9.0. The following results were obtained:

| Sample | Elution pH | Volume, ml. | CCA/ml. | Total CCA | Percent recovery |
|---|---|---|---|---|---|
| Infected Allantoic fluid | | 750 | 201 | 150,750 | |
| Column A | 6.8 | 21 | 5,054 | 106,134 | 71 |
| Column B | 7.5 | 38 | 2,624 | 99,712 | 66 |
| Column C | 8.0 | 43 | 3,258 | 140,094 | 93 |
| Column D | 9.0 | 37 | 2,479 | 91,723 | 61 |

EXAMPLE XVII

In a manner similar to the preceding examples, the purification of A/PR–8 strain of influenza virus is carried out on four columns. The virus is eluted with 1.0 molar phosphate buffer, pH 6.8, 7.5, 8.0 and 9.0. The following results are obtained:

| Sample | Elution pH | Volume, ml. | CCA/ml. | Total CCA | Percent recovery |
|---|---|---|---|---|---|
| Infected Allantoic fluids | | 750 | 329 | 246,750 | |
| Column A | 6.8 | 34 | 7,130 | 242,420 | 98 |
| Column B | 7.5 | 35 | 6,592 | 230,720 | 94 |
| Column C | 8.0 | 52 | 4,086 | 212,472 | 86 |
| Column D | 9.0 | 41 | 5,075 | 208,075 | 85 |

EXAMPLE XVIII

In a manner similar to the preceding examples, the purification of A/Jap. 170 strain of influenza virus is carried out on eight columns. The virus is eluted with 1.0 molar phosphate buffer at pH ranges from 5.0 to 9.0. The following results are obtained:

| Sample | Elution pH | Volume, ml. | CCA/ml. | Total CCA | Percent recovery |
|---|---|---|---|---|---|
| Infected Allantoic fluid | | 750 | 124 | 93,000 | |
| Column A | 6.8 | 32 | 2,104 | 67,328 | 72 |
| Column B | 7.5 | 33 | 1,742 | 57,486 | 62 |
| Column C | 8.0 | 33 | 1,375 | 45,375 | 49 |
| Column D | 9.0 | 59 | 826 | 48,734 | 52 |
| Infected Allantoic fluid | | 750 | 232 | 174,000 | |
| Column E | 5.0 | 30 | 3,705 | 111,150 | 64 |
| Column F | 5.5 | 34 | 4,728 | 160,752 | 92 |
| Column G | 6.0 | 39 | 4,660 | 181,740 | 104 |
| Column H | 6.5 | 36 | 4,885 | 175,860 | 101 |

EXAMPLE XIX

In a manner similar to the preceding examples, the purification of $A_2$/Taiwan strain of influenza virus is carried out on six columns. The virus is eluted with 1.0 molar phosphate buffer at pH ranges from 5.0 to 8.0. The following results are obtained:

| Sample | Elution pH | Volume, ml. | CCA/ml. | Total CCA | Percent recovery |
|---|---|---|---|---|---|
| Infected Allantoic fluid | | 750 | 295 | 221,250 | |
| Column A | 6.0 | 40 | 4,938 | 197,520 | 89 |
| Column B | 6.5 | 34 | 4,855 | 165,070 | 74 |
| Column C | 7.5 | 38 | 4,137 | 157,206 | 71 |
| Column D | 8.0 | 43 | 4,200 | 159,600 | 72 |
| Infected Allantoic fluid | | 750 | 206 | 154,500 | |
| Column E | 5.5 | 46 | 2,831 | 130,226 | 84 |
| Column F | 5.0 | 38 | 2,391 | 90,858 | 59 |

EXAMPLE XX

In a manner similar to the preceding examples, the purification of A/Jap. 170 strain of influenza virus is carried out on a series of columns. The undiluted virus fluid is applied to the columns and is eluted with phosphate buffer, pH 6.8 and 8.0 at 0.5 M, 0.75 M, and 1.0 M concentrations. Recoveries of the virus so processed are as follows:

| Sample | Elution pH and concentration | Volume, ml. | CCA ml. | Total CCA | Percent recovery |
|---|---|---|---|---|---|
| Infected Allantoic fluid | | 500 | 231 | 115,500 | |
| Column A | 0.5M, 6.8 | 33 | 2,930 | 96,690 | 84 |
| Column B | 0.5M, 8.0 | 38 | 2,799 | 106,362 | 92 |
| Column C | 0.75M, 6.8 | 39 | 2,718 | 101,302 | 82 |
| Column D | 0.75M, 8.0 | 42 | 2,750 | 115,500 | 100 |
| Column E | 1.0M, 6.8 | 28 | 3,400 | 95,200 | 82 |
| Column F | 1.0M, 8.0 | 25 | 2,963 | 73,875 | 64 |

While the foregoing invention has been described with some degree of particularity in the descriptive matter and in the specific examples provided, the same was for purposes of clarity and definition and is not to be considered in any way as a limit on the scope of the invention. The invention is to be limited only by the claims appended hereto.

What is claimed is:

1. A virus adsorbent which comprises the product produced by:
   (a) treating an aqueous suspension of calcium dihydrogen orthophosphate monohydrate containing from about one to not more than about five parts of water with an alkali, at a temperature of not more than about 40° C., to adjust the pH of the suspension to a range of from about 5.5 to about 8.0;
   (b) washing the solid of said suspension with water until the water wash has a pH at least about 0.2 unit higher than the adjusted pH of the above suspension and is in the range of from about 5.7 to about 8.2.

2. A virus adsorbent which comprises the product produced by:
   (a) treating an aqueous suspension of calcium dihydrogen orthophosphate monohydrate containing from about one to not more than about five parts of water with an alkali, at a temperature of not more than about 40° C., to adjust the pH of the suspension to a range of from about 5.5 to about 8.0;
   (b) washing the solid of said suspension with water until the water wash has a pH at least about 0.2 unit higher than the adjusted pH of the above suspension and is in the range of from about 5.7 to about 8.2; and
   (c) washing the solid of said washed suspension with an aqueous alkali metal trimetaphosphate solution until the pH of the suspension is in the range of from about 7.5 to about 8.5.

3. A method of preparing a stable adsorbent particularly adapted for the purification of virus which comprises, suspending calcium dihydrogen orthophosphate monohydrate with water in an amount of from about one to not more than about five parts of water per part of the compound, maintaining the suspension at a temperature of not more than about 40° C., adding sufficient alkali to said suspension to adjust the pH thereof to the range of from about 5.5 to about 8.0, decanting excess water from the mixture, and washing the adsorbent with water until the water wash has a pH at least about 0.2 unit higher than the adjusted pH of the above suspension and is in the range of about 5.7 to about 8.2.

4. A method as described in claim 3 for preparing a stable adsorbent for virus purification which comprises suspending calcium dihydrogen orthophosphate monohydrate with water in the ratio of from about one to about two parts of water per part of the salt, maintaining the suspension at a temperature of not more than about 40° C., slowly adding to said suspension with mixing sufficient alkali to adjust the pH of the mixture to about 6.5, decanting excess water from the mixture and washing the adsorbent with water until the remaining supernatant liquid has a pH of about 7.0.

5. A method as described in claim 3 for preparing a stable activated adsorbent for virus purification which comprises suspending calcium dihydrogen orthophosphate monohydrate with water in the ratio of one part of the salt to about five parts of water, maintaining said suspension at a temperature of not more than about 40° C., adding to said suspension sufficient alkali to adjust the pH thereof to the range of from about 5.5 to about 8.0, decanting excess water from the mixture, washing the mixture with water until the water wash has a pH at least about 0.2 unit higher than the adjusted pH of the above suspension and has a pH of at least about 5.7 and not more than about 8.2, and further washing said suspended adsorbent with a solution of an alkali metal trimetaphosphate until the suspension has a pH of about 7.5 to about 8.5.

6. A method as described in claim 3 for preparing a stable activated adsorbent for virus purification which comprises suspending calcium dihydrogen orthophosphate monohydrate with water in the ratio of about one part of the salt to about five parts of water, maintaining the suspension at a temperature of not more than about 40° C., adding to said suspension sufficient alkali to adjust the pH thereof to the range of from about 5.5 to about 8.0, decanting excess water from the mixture, washing the mixture with water until the water wash has a pH at least about 0.2 unit higher than the adjusted pH of the above suspension and has a pH of about 5.7 to about 8.2 and further washing said suspended adsorbent with an alkali metal trimetaphosphate solution until the suspension has a pH of about 8.0.

7. A method as described in claim 3 for preparing a stable activated adsorbent for virus purification which comprises suspending calcium dihydrogen orthophosphate monohydrate with water in the ratio of about one part of salt to about two parts of water, maintaining said suspension at about room temperature, adding sufficient alkali to the suspension to bring the pH to about 6.5, decanting excess water from the mixture, washing the mixture with water until the water wash has a pH of about 6.7 to about 7.5 and further washing said suspended adsorbent with a sodium trimetaphosphate solution until the suspension has a pH of about 8.0.

References Cited

UNITED STATES PATENTS 3,197,374    7/1965    Hennessen et al. _____ 23—109
3,401,014    9/1968    Saeman _____ 23—109

OTHER REFERENCES

Journal of Dental Research, March–April 1963, p. 694 pertinent.

PATRICK P. GARVIN, Primary Examiner

U.S. Cl. X.R.

23—109; 424—89